(12) United States Patent
Winker

(10) Patent No.: US 7,083,372 B2
(45) Date of Patent: Aug. 1, 2006

(54) WASHER AND FASTENING ELEMENT

(75) Inventor: Alexander Winker, Spaichingen (DE)

(73) Assignee: Metallwarenfabrik Hermann Winker GmbH & Co. KG, Spaichingen (DE)

( * ) Notice: Subject to any disclaimer, the term of this patent is extended or adjusted under 35 U.S.C. 154(b) by 0 days.

(21) Appl. No.: 10/981,124

(22) Filed: Nov. 4, 2004

(65) Prior Publication Data

US 2005/0095085 A1    May 5, 2005

(30) Foreign Application Priority Data

Nov. 4, 2003    (DE)    ............................ 203 17 178 U

(51) Int. Cl.
F16B 39/34    (2006.01)

(52) U.S. Cl. .................... 411/313; 411/155; 411/204; 411/533

(58) Field of Classification Search ................ 411/313, 411/314, 296, 299, 155, 156, 204, 205, 212, 411/209, 210, 246, 253, 254, 255, 256, 533
See application file for complete search history.

(56) References Cited

U.S. PATENT DOCUMENTS

| | | | | |
|---|---|---|---|---|
| 295,960 A | * | 4/1884 | Van Dusen | ................. 411/253 |
| 405,632 A | * | 6/1889 | Warren | ........................ 411/201 |
| 621,456 A | * | 3/1899 | Jamieson | ..................... 411/314 |
| 968,991 A | * | 8/1910 | Shafer | ......................... 411/313 |
| 1,391,378 A | * | 9/1921 | Gaston | ........................ 411/155 |
| 1,598,165 A | * | 8/1926 | Stevenson | ................... 411/313 |
| 1,801,999 A | * | 4/1931 | Bowman | ..................... 411/131 |
| 1,816,192 A | * | 7/1931 | Nagano | ...................... 411/201 |
| 2,151,919 A | | 3/1939 | Jacobson | |
| 2,225,654 A | | 12/1940 | Olson | |
| 2,290,056 A | * | 7/1942 | Koubek | ...................... 411/313 |
| 2,631,633 A | | 3/1953 | Peckham | |
| 3,421,563 A | * | 1/1969 | Koss | ........................... 411/313 |
| 3,881,392 A | | 5/1975 | Curtis | |

FOREIGN PATENT DOCUMENTS

| | | |
|---|---|---|
| DE | 1 286 815 B | 1/1969 |
| DE | 26 49 077 C2 | 5/1977 |

OTHER PUBLICATIONS

German Search Report for German Appln. No. 203 17 178.0, Apr. 26, 2005.

* cited by examiner

Primary Examiner—Flemming Saether
(74) Attorney, Agent, or Firm—Kriegsman & Kriegsman

(57) ABSTRACT

A washer for a fastening element, having a circumferential flange, having an annular washer body provided with an opening, and having at least one holding web, wherein on the inner face of the opening there are disposed at least two claws, which jut radially into the opening.

13 Claims, 2 Drawing Sheets

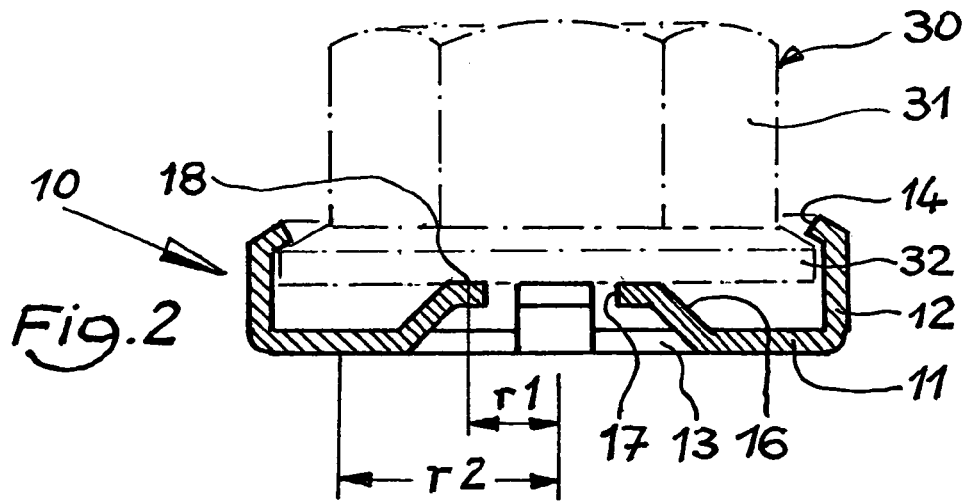
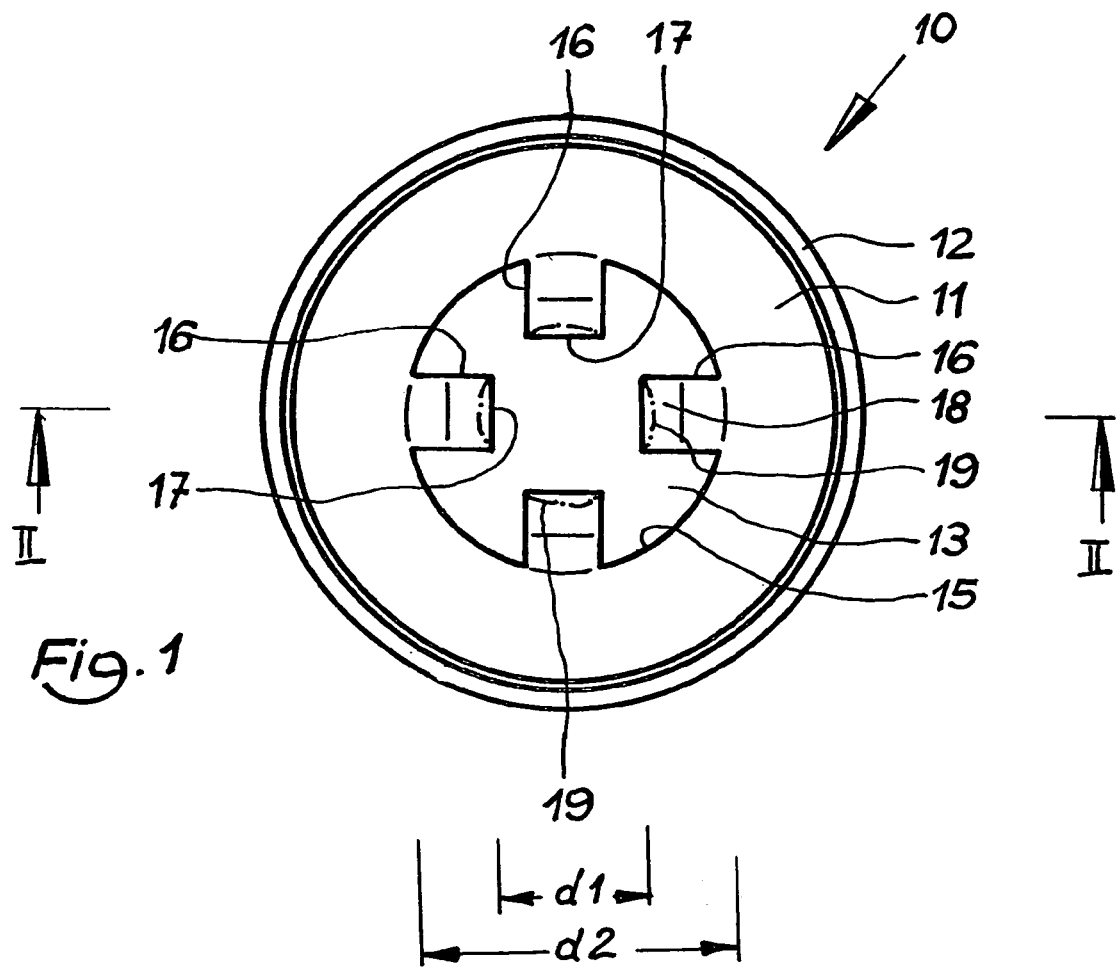

WASHER AND FASTENING ELEMENT

BACKGROUND OF THE INVENTION

The present invention relates to a washer for a fastening element, having a circumferential flange, having an annular washer body provided with an opening, and having at least one holding web. The invention further relates to a fastening element having a washer of this type.

A washer of the generic type is known from EP 1 091 135 A2. This washer has a washer body having at least two formed-on holding lugs, which can be placed around a circumferential flange provided on the fastening element. The washer is thereby held captively against the fastening element.

When a nut with washer is tightened on a fixed screw bolt, the washer is meant not to twist relative to the clamped structural part. To this effect, the coefficient of friction between the washer and a structural part is enhanced by the fact that notches are provided on the washer body of the washer. These cause the washer to remain on the surface of the structural part as tightening takes place on a screw bolt, even if the coefficient of friction between washer body and structural part is low per se.

German utility model DE 94 00 671 U1 describes a washer which, instead of holding lugs, has an annular web running round the washer body. Measures to enhance the coefficient of friction between washer body and structural part are not disclosed. In this embodiment, there is additionally the risk of nut and washer sticking together when surface coatings are applied.

U.S. Pat. No. 2,151,919 A likewise relates to a nut having a washer, the washer body of which has on the top and bottom side notches which interact both with the surface of the structural part and with the bottom side of the nut. The notches serve merely to protect against loosening of the joint.

In the use of fastening elements having washers of the generic type, there is always the risk of damage to the surface of the structural part as a result of the notches being canted or pressed in in the structural part. Moreover, the manufacture of the previously known washers, with the modifications of their washer bodies, is complex, since the notches or other surface alterations have to be added subsequent to the washer having been made.

The object of the present invention consists in providing a washer of the generic type, which, whilst offering comparable performance, is of simpler configuration and easier to make and can be used without damage to the surface of the structural part, and in which the risk of fastening element and washer sticking together is at least reduced.

SUMMARY OF THE INVENTION

The solution consists in a washer having the features of claim 1. According to the invention, it is thus envisaged that on the inner face of the opening there are disposed at least two claws, which jut radially into the opening.

The advantage of the inventive design of the washer consists in the fact that, in each phase of the fastening operation, i.e. as the fastening element is screwed in and tightened on a screw bolt, it always remains stationary on the surface of the adjoining structural part to be fastened, regardless of the magnitude of the acting forces. This effect is based essentially upon two mechanisms.

At the beginning of the fastening operation, it is possible to distinguish between two differently sized friction radii. The first, smaller friction radius r1 is defined by the diameter of the bearing region of the fastening element on the claws. The second, larger friction radius r2 is defined by the diameter of the effective friction surface of the washer on the structural part. Since the effective friction torque is proportional to the friction radius, the friction torque between washer body and structural part is greater than the friction torque between fastening element and claws.

The result is that the washer, even at the beginning of the fastening operation and also in the further course thereof, remains stationary and does not turn with the fastening element. This effect can be further reinforced, where necessary, if the bearing surface is arched slightly inwards so that it bears upon the structural part only with its outer rim. The washer can therefore be configured in the style of a cup spring.

In a later phase of the fastening operation, a sufficiently large pressure is exerted upon the claws by the bottom side of the fastening element that they move downwards in the direction of the structural part and, at the same time, inwards into the opening in the washer body. This means that the claws are pressed into the thread of the screw bolt and are wedged therein. This has the effect, on the one hand, that the washer remains stationary also in a later phase of the fastening operation and, on the other hand, that the strength of the joint between fastening element and screw bolt is enhanced.

The pressing of the claws into the thread of the screw bolt causes the free end of the claws to deform in such a way that a screw thread is formed. This means that, when the fastening element is loosened, the washer turns along with it.

This design further has the effect that a fastening element connected to the washer according to the invention bears in the unlined state upon the claws. A gap consequently remains between the bottom side of the fastening element and the washer body. If the fastening element is coated, for example, with paint, oil or wax, the excess material is better able to drain away when the coating material is then spun off. The risk of fastening element and washer sticking together is hence at least diminished.

The washer according to the invention is suitable for all types of fastening elements, especially for various nut types, for example standard hexagon nuts. It can be easily made by punching-out and forming of the holding web and the claws, holding web and claws being able to be formed in a single operation.

The subject of the present invention is additionally a fastening element having a washer of this type.

Advantageous refinements are derived from the subclaims.

A particularly preferred embodiment of the washer has three or four claws, which are preferably disposed such that they are mutually offset. The aforementioned effects are particularly effective in this embodiment.

Another advantageous refinement envisages that the free ends of the claws, in the direction of the fastening element, lie above the washer body, so that, in the fastening operation, they are pressed particularly far downwards and inwards and hence particularly firmly into the thread of the screw bolt.

Advantageously, the claws, on their side facing the fastening element, are respectively provided with a bearing surface for the bottom side of the fastening element, so that the relevant friction radius r1 can be more exactly defined. This bearing surface can be formed, for example, by the claws having an approximate S-shape or Z-shape in cross section. The claws can also, however, be of rectilinear configuration. The height of the claws above the washer body is preferably just as large to twice as large as the material thickness.

The claws can further, at their free end, have an indentation in the shape of a circular segment, which makes it easier for the claws to be pressed into the thread of the screw bolt. The shape and size of the indentation can herein be matched to the circumference of the screw bolt. Alternatively, however, the claws can also have a straight edge at their free end, with the result that they are pressed particularly far into the thread of the screw bolt, are even more heavily deformed and are even more effectively wedged.

Depending on the design of the washer and of the fastening element, the claws can be about 1 to 3 mm long. Preferably, their length corresponds to about twice the thickness of the material used for the manufacture of the washer (e.g. sheet metal). It is important that the length of the claws is dimensioned such that, following the screw connection, the diameter d1 which they define is less than the core diameter of the screw bolt which is used. That is to say, therefore, that they have an oversize relative to the core diameter of the screw bolt. Finally, it is advantageous to tailor the diameter d2 of the opening in the washer body to the nominal diameter of the thread of the fastening element, thereby producing an optimal, force-absorbing supporting surface.

The at least one holding web of the washer can be configured as a closed circumferential annular web, or in the form of an annular web having single or multiple radial slots, or in the form of at least two holding lugs. A closed annular web simplifies the punching tool for the manufacture of the washer, whilst divided holding webs facilitate the forming.

BRIEF DESCRIPTION OF THE DRAWINGS

The invention is described in greater detail below with reference to an illustrative embodiment represented in the appended figures, in which:

FIG. 1 shows a top view of an embodiment of a washer according to the invention in diagrammatic non-scale representation;

FIG. 2 shows a sectional representation of the washer along the line II—II in FIG. 1;

DETAILED DESCRIPTION OF PREFERRED EMBODIMENTS

Figure 3:
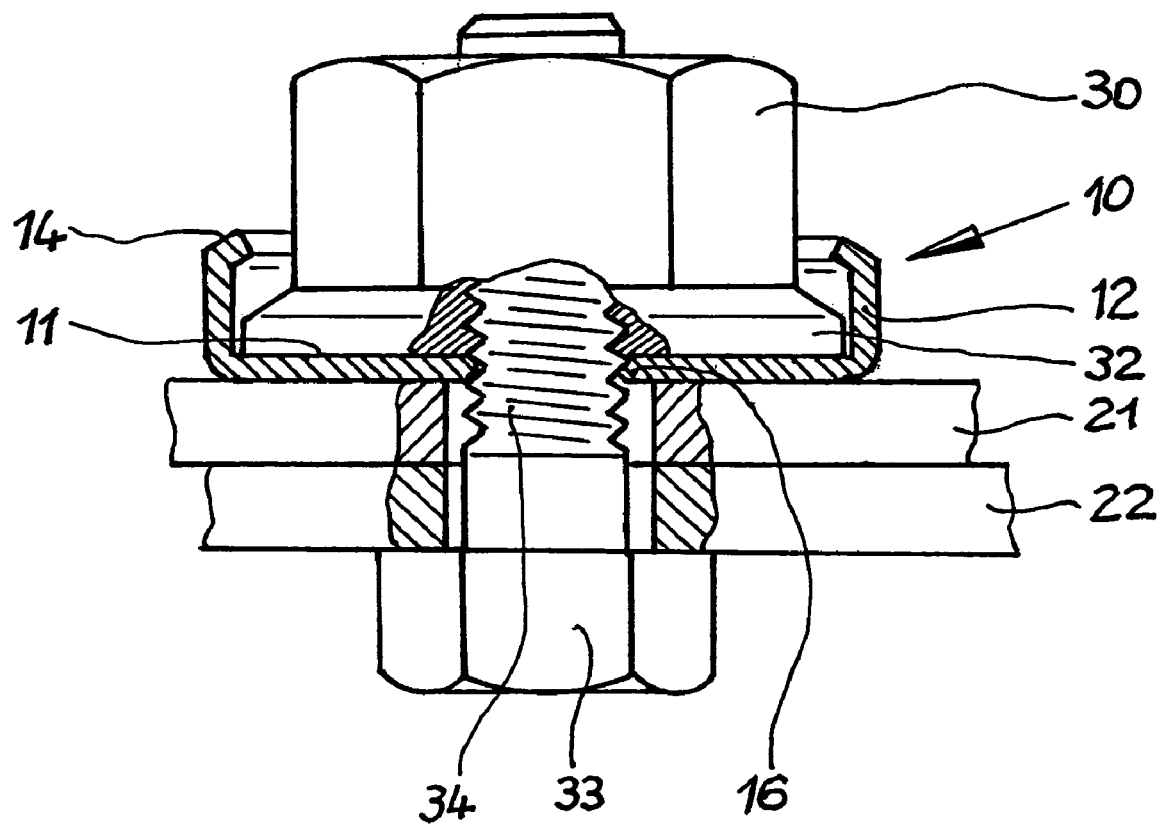
FIG. 3 shows a partially cut representation of a fastening element with the washer according to FIG. 1, after structural parts have been bolted together.

FIGS. 1 and 2 show an illustrative embodiment of a washer 10 according to the invention, the fastening element 30, in the example a standard hexagon nut, being indicated in FIG. 2 in dash-dot representation. The nut 30 has a nut body 31 having a circumferential outer flange 32. The flange 32 is formed onto the nut body 31 in one piece.

The washer 10 has a washer body 11 having a circumferential annular web 12. The washer body 11 is provided with an opening 13, which in the illustrative embodiment has a diameter d2 which is tailored to the diameter of the fastening element used. The annular web 12 juts in the axial direction over the flange 32 of the nut body 31 and, at its upper end 14, is bent radially inwards over the flange 32. Of course, instead of a circumferential annular web, a single-slotted or multi-slotted annular web can also be configured.

Finally, individual (at least two) holding lugs can also be provided.

The washer 10 is held on the fastening element 30 in a loosely rotatable manner. To this effect, an at least minor play is provided both axially and radially between the flange 32 of the nut body 31 and the annular web 12 of the washer 10.

From the inner face 15 of the opening 13, claws 16, in the illustrative embodiment four, offset by the same angle, jut radially into the opening 13. More than four or less than four claws 16 may also be provided. Nor do the claws 16 necessarily have to be mutually offset by the same angle.

In the illustrative embodiment, the ends 17 of the claws 16 are disposed, in the direction of the fastening element 30, above the washer body 11. The distance to the washer body 11 amounts, in the illustrative embodiment, to twice the thickness of the sheet metal used for the washer, i.e. about 2 mm. The distance can also, however, be larger or smaller, as desired. The claws are additionally bent in an approximate S-shape in cross section. The upper part of the S herein forms a bearing surface 18 for the bottom side of the fastening element 30.

In the illustrative embodiment, the length of the claws 16 corresponds to about twice the thickness of the sheet metal used for the manufacture of the washer 10 and amounts to about 2 mm in the case of a 1 mm sheet thickness. With their free ends 17, the claws 16 define a diameter d1 within the opening 13 in the washer body 11. The diameter d1 is therefore smaller than the diameter d2 of the opening 13 itself. The length of the claws 16 is dimensioned in the individual case such that the diameter d1, following the screw connection, is less than the core diameter of the screw bolt respectively used. The claws 16 therefore have an oversize relative to the core diameter of the screw bolt.

In the illustrative embodiment, the ends 17 of the claws 16 are of linear configuration. In FIG. 1, a further variant is indicated in dash-dot representation, in which the ends 17 have indentations 19 in the shape of a circular segment. The curvature of the indentations 19 can additionally be matched to the diameter of a screw bolt to be subsequently screwed in.

The washer 10 according to the invention is manufactured, in a manner which is known per se, by punching out a blank and then forming the annular web 12 and the claws 16. The annular web 12 and the claws 16 can herein be formed in one operation.

FIG. 3 shows the fastening element 30 with the washer 10 from FIG. 1 after two structural parts 21, 22 have been fitted together by means of a screw bolt 33. It can be seen from FIG. 3 that the forces generated by the screw bolt 33, as the fastening element 30 has been pulled down in the direction of the washer body 11, have forced the claws 16 downwards and inwards, and, in so doing, have pressed them into the thread 34 of the screw bolt and wedged them therein.

The washer according to the invention thus manages without subsequent modifications of the washer body 11 and yet reliably prevents the washer from turning during the fastening operation.

The invention claimed is:

1. A washer for a fastening element, the fastening element having a circumferential flange, said washer comprising an annular washer body having at least one holding web positioned over the flange to hold the washer to the fastening element while allowing for relative rotation, said annular washer body being provided with an opening, wherein on the inner face of the opening there are disposed at least two claws; which jut radially into the opening, said at least two claws having free ends that are located above the washer body and in the direction of the fastening element whereby the claws are pushed inward as the fastener element is driven home.

2. The washer as claimed in claim 1, wherein on the inner face of the opening there are disposed three or four claws.

3. The washer as claimed in claim 1, wherein the distance of the free ends of the claws to the washer body is at least equal to and no more than twice as great as the thickness of the material used for the washer.

4. The washer as claimed in claim 1, wherein the claws, on their side facing the fastening element, respectively, have a bearing surface.

5. The washer as claimed in claim 1, wherein the claws in cross section have an approximate S-shape or Z-shape.

6. The washer as claimed in claim 1, wherein the claws are rectilinear in cross section.

7. The washer as claimed in claim 1, wherein the free ends of the claws have an indentation approximately in the shape of a circular segment.

8. The washer as claimed in claim 1, wherein the free ends of the claws are of straight configuration.

9. The washer as claimed in claim 1, wherein the claws have a length corresponding to about twice the thickness of the material used for the washer.

10. The washer as claimed in claim 1, wherein the at least one holding web is configured as a closed circumferential annular web, or in the form of an annular web having single or multiple radial slots, or in the form of at least two holding lugs.

11. The washer as claimed in claim 1, wherein the opening has a diameter tailored to the nominal diameter of the thread of the fastening element.

12. The washer as claimed in claim 1, wherein, in a cup-spring-like configuration, the at least two claws define a bearing surface that is arched slightly inwards.

13. The washer as claimed in claim 1 wherein said fastening element is a nut.

\* \* \* \* \*